US010880082B2

(12) United States Patent
Elliott et al.

(10) Patent No.: US 10,880,082 B2
(45) Date of Patent: Dec. 29, 2020

(54) REKEYING KEYS FOR ENCRYPTED DATA IN NONVOLATILE MEMORIES

(71) Applicant: HEWLETT PACKARD ENTERPRISE DEVELOPMENT LP, Houston, TX (US)

(72) Inventors: Robert C. Elliott, Houston, TX (US); Melvin K. Benedict, Magnolia, TX (US); Michael White, Houston, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 30 days.

(21) Appl. No.: 15/788,661

(22) Filed: Oct. 19, 2017

(65) Prior Publication Data

US 2019/0123900 A1   Apr. 25, 2019

(51) Int. Cl.
| | |
|---|---|
| *G06F 9/00* | (2006.01) |
| *G06F 15/177* | (2006.01) |
| *H04L 9/08* | (2006.01) |
| *G06F 12/14* | (2006.01) |
| *G06F 9/4401* | (2018.01) |
| *G06F 21/57* | (2013.01) |

(52) U.S. Cl.
CPC .......... *H04L 9/0891* (2013.01); *G06F 9/4406* (2013.01); *G06F 12/1408* (2013.01); *G06F 21/575* (2013.01); *H04L 9/0894* (2013.01); *G06F 2212/1052* (2013.01)

(58) Field of Classification Search
CPC .................................................... H04L 9/0891
See application file for complete search history.

(56) References Cited

U.S. PATENT DOCUMENTS

| | | | |
|---|---|---|---|
| 7,681,050 B2 | 3/2010 | Blom et al. | |
| 8,468,365 B2 | 6/2013 | Gueron et al. | |
| 2004/0034785 A1* | 2/2004 | Tai .................. | G06F 21/572 713/189 |
| 2007/0074047 A1 | 3/2007 | Metzger et al. | |
| 2008/0091955 A1 | 4/2008 | Leach | |
| 2008/0285748 A1* | 11/2008 | Lee .................... | G06F 21/73 380/44 |
| 2011/0055543 A1* | 3/2011 | Guo ................. | G06F 9/4406 713/2 |
| 2011/0087872 A1* | 4/2011 | Shah ................ | H04L 9/3236 713/2 |

(Continued)

OTHER PUBLICATIONS

Amazon Web Services, "Rotating Keys," (Web Page): 2017, 2 pages, http://docs.aws.amazon.com/kms/latest/developerguide/rotate-keys.html.

(Continued)

*Primary Examiner* — Mohammed H Rehman
(74) *Attorney, Agent, or Firm* — Park, Vaughan, Fleming & Dowler LLP

(57) ABSTRACT

In some examples, a device includes a memory controller to, during a power-on process of the device: read encrypted data from a nonvolatile memory, decrypt, using a first key, the encrypted data to produce decrypted data, encrypt, using a second key different from the first key produced as part of rekeying, the decrypted data to produce new encrypted data, and write the new encrypted data to the nonvolatile memory. A power-on code is to prevent booting of the device until all data in the nonvolatile memory has been encrypted using the second key.

20 Claims, 4 Drawing Sheets

(56) References Cited

U.S. PATENT DOCUMENTS

2016/0004866 A1* 1/2016 Lin ...................... H04L 9/0643
　　　　　　　　　　　　　　　　　　　　　　713/164

OTHER PUBLICATIONS

Dorrendorf, L., "Protecting Drive Encryption Systems Against Memory Attacks," (Research Paper), May 6, 2011, pp. 1-15, https://eprint.iacr.org/2011/221.pdf.
Gueron, A Memory Encryption Engine Suitable for General Purpose Processors, 2016 (14 pages).
http://www.seagate.com/tech-insights/fips-140-2-standard-and-self-encrypting-drive-techn—FIPS 140-2 downloaded Oct. 2, 2017 (3 pages).
Kesavan, V. T. et al., "Multiple Secret Keys Based Security for Wireless Sensor Networks," (Research Paper), Apr. 2012, pp. 68-76, http://ijcnis.org/index.php/ijcnis/article/viewFile/136/92.
Micron—Faq: What is a "FIPS-Validated" SED? Feb. 2017 (4 pages).
Wikipedia, Advanced Encryption Standard last edited Sep. 26, 2017 (12 pages).
Wikipedia, Disk encryption theory last edited on Sep. 11, 2017 (8 pages).
Wikipedia, Merkle tree last edited Sep. 27, 2017 (4 pages).
Wikipedia, Software Guard Extensions last edited Sep. 27, 2017 (3 pages).
Zhao, L. et al., "Hypnoguard: Protecting Secrets Across Sleep-wake Cycles," (Research Paper), 2016, ACM, 13 pages, http://users.encs.concordia.ca/~mmannan/publications/hypnoguard-ccs16.pdf.

* cited by examiner

REKEYING KEYS FOR ENCRYPTED DATA IN NONVOLATILE MEMORIES

BACKGROUND

An electronic device can include a processor and memory. The memory can store data and machine-readable instructions that are executable on the processor. A memory can include a volatile memory or a nonvolatile memory.

BRIEF DESCRIPTION OF THE DRAWINGS

Some implementations of the present disclosure are described with respect to the following figures.

Figure 1:
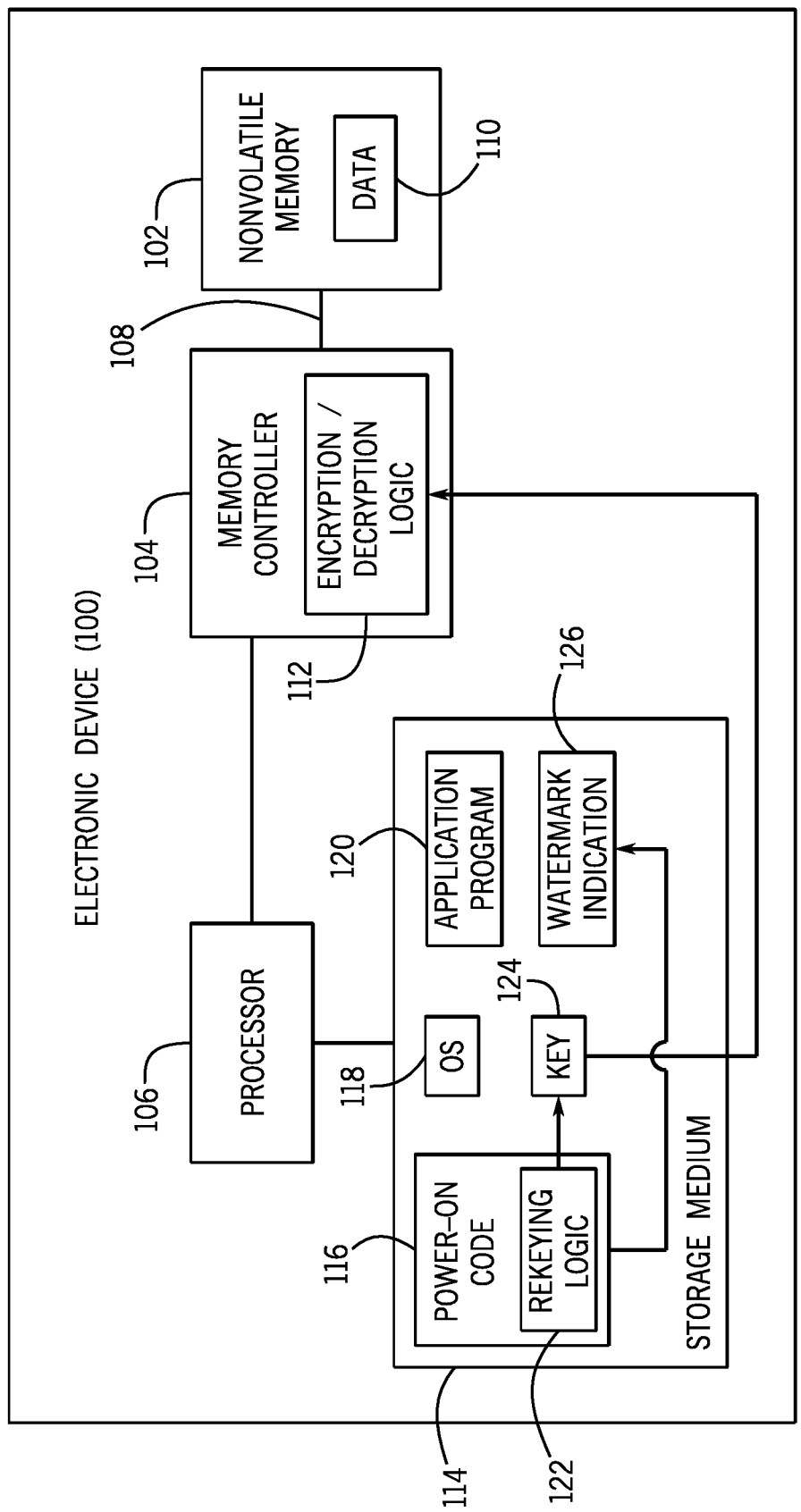
FIG. 1 is a block diagram of an electronic device according to some examples.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an", or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

An electronic device can include a nonvolatile memory (also referred to as persistent memory) to store data in a persistent manner. A nonvolatile memory refers to a memory that is able to maintain its stored data (i.e., not lose the stored data) even when power is removed from the nonvolatile memory. Examples of nonvolatile memory can include any or some combination of the following: a flash memory, an electrically erasable and programmable read-only memory (EEPROM), a magnetoresistive random access memory (MRAM), a memristor memory, a phase change memory, a spin-transfer torque memory, a dynamic random access memory (DRAM) that is backed by a nonvolatile memory, a disk-based magnetic or optical storage, and so forth. In some cases, a nonvolatile memory can also be referred to as a storage class memory, which is persistent memory that is slower than DRAM but faster than flash memory.

An electronic device can also include volatile memory, such as any combination of the following: a DRAM, a static random access memory (SRAM), and so forth.

Data in the nonvolatile memory can be protected against unauthorized access by encrypting the data using hardware, such as by a memory controller that manages access of the data. A program (including machine-readable instructions such as those of a software program or firmware program) can perform writes of data to the nonvolatile memory. The memory controller can encrypt the data to produce encrypted data that is then stored in the nonvolatile memory. The encryption of the data by the memory controller can be performed without knowledge of the program; i.e., the program is unaware that the memory controller has encrypted the data provided by the program in a write operation prior to storing the encrypted data in the nonvolatile memory. Stated differently, the encryption of data by the memory controller is transparent to the program.

The encryption of data by the memory controller is performed using an encryption key. An encryption key can refer to a value that is used by an encoding function to convert an input data to a different data (encrypted data). Any of various different types of encryption can be applied by the memory controller, including any or some combination of the following: an encryption algorithm such as the Advanced Encryption Standard (AES) encryption, such as Xor-encrypt-xor (XEX)-based tweaked-codebook mode with ciphertext stealing (XTS); Data Encryption Standard (DES) encryption; a block cipher mode such as XTS (XOR encrypt XOR-based tweaked codebook mode with ciphertext stealing) defined by IEEE Standard 1619, CBC (cipher block chaining) defined by NIST SP800-38A; and so forth.

In some cases, even when hardware-based encryption is employed for data in a nonvolatile memory, an unauthorized user can perform a replay attack by physically removing the nonvolatile memory from an electronic device, rewriting the removed nonvolatile memory or another nonvolatile memory with an old copy of data, and re-installing the removed nonvolatile memory or another nonvolatile memory storing the old copy of data in the electronic device. The old copy of data may have been obtained by malware executing in the electronic device, or by another technique. The old copy of data is encrypted data that has been encrypted using the appropriate encryption key. As a result, when a program in the electronic device subsequently reads the old copy of data from the re-installed nonvolatile memory, the old copy of data will be decrypted successfully using the encryption key.

This type of replay attack can be used by an attacker to revert the data in a nonvolatile memory to a prior state, such as to a prior account balance (e.g., money balance, credit balance, etc.) that would allow the attacker to fool a program into believing that the attacker has a higher balance than actually available. As examples, an account balance can allow a user to access a network (e.g., a cellular network, a Wi-Fi network, etc.), access multimedia content (e.g., video files, music files, etc.), or to access other content and/or services.

In accordance with some implementations of the present disclosure, to prevent a replay attack or to reduce the likelihood of a successful replay attack, rekeying techniques or mechanisms are provided to change an encryption key that is used for storing data in a nonvolatile memory each time a power-on process is performed by an electronic device. A power-on process refers to a process of the electronic device performed in response to a power cycle, in which removal of power from the electronic device (or components of the electronic device) is followed by re-application of power to the electronic device (or the components of the electronic device). In accordance with some implementations of the present disclosure, the power-on process can prevent booting of the electronic device until all data in the nonvolatile memory has been rekeyed. As used here, "all data in the nonvolatile memory" can refer to an entirety of the data stored in the nonvolatile memory, or to a segment of the data stored in the nonvolatile memory that is the subject of protection using the rekeying techniques or mechanisms.

By preventing the booting of the electronic device until all data in the nonvolatile memory has been rekeyed, it can be ensured that the nonvolatile memory stores data encrypted using a new key, and no data remains that was encrypted using an old key. As a result, once the electronic device is booted following the power-on process, no data encrypted using an old key remains in the nonvolatile memory (or the relevant segment of the nonvolatile memory) that can be used for unauthorized purposes, and moreover, old data can no longer be used to replace blocks in memory, which are all using the new key now.

FIG. 1 is a block diagram of an electronic device 100 that includes a nonvolatile memory 102 and a memory controller 104 that controls access of the nonvolatile memory 102. Although not shown, the memory controller 104 can also control access of a volatile memory in some examples. Examples of electronic devices include any or some combination of the following: a desktop computer, a notebook computer, a tablet computer, a smartphone, a server computer, a communication node (e.g., a router, a switch, a gateway, etc.), a game appliance, a wearable device (e.g., smart eyeglasses, a smart watch, a head-mounted device, etc.), a home appliance, a vehicle (or equipment in a vehicle), an internet-of-things (IoT) device, and so forth.

The memory controller 104 can be implemented as a hardware processing circuit, or a combination of a hardware processing circuit and machine-readable instructions (e.g., firmware or software) executable on the hardware processing circuit.

As depicted in FIG. 1, the nonvolatile memory 102 stores data 110, which can include user data, application data, machine-readable instructions, and so forth.

The electronic device 100 also includes a processor 106, which is able to issue a memory request to access the nonvolatile memory 102. A processor can include a microprocessor, a core of a multi-core microprocessor, a microcontroller, a programmable integrated circuit, a programmable gate array, or another hardware processing circuit.

Although FIG. 1 shows the memory controller 104 as being separate from the processor 106, it is noted that in other examples, the memory controller 104 can be part of the processor 106. In further examples, the memory controller 104 can be integrated with the nonvolatile memory 102, such as on an integrated circuit (IC) chip. Alternatively, the memory controller 104 and the nonvolatile memory 102 can be part of separate IC chips.

The memory controller 104 is able to receive a memory request from the processor 106. The memory request can include a write request (to write data to the nonvolatile memory 102) or a read request (to read data from the nonvolatile memory 102). The memory controller 104 generates, in response to the memory request, a memory access command over a memory interface 108 between the memory controller 104 and the nonvolatile memory 102. The memory access command causes the nonvolatile memory 102 to perform the requested memory operation. If the memory operation is a read operation, then data is retrieved from the nonvolatile memory 102 and returned by the memory controller 104 to the processor 106. If the memory operation is a write operation, then the memory controller 104 stores the write data in the write request to the nonvolatile memory 102.

Although examples according to FIG. 1 show the processor 106 as being the electronic component that is able to issue memory requests to the nonvolatile memory 102, it is noted that in other examples, other types of electronic components, including input/output (I/O) devices, are able to issue memory requests to the nonvolatile memory 102.

The memory controller 104 includes encryption/decryption logic 112, which can perform encryption and decryption of data. During a write to the nonvolatile memory 102, the encryption/decryption logic 112 can encrypt the write data, and the memory controller 104 stores the encrypted write data in the nonvolatile memory 102. During a read operation, the encryption/decryption logic decrypts encrypted data retrieved from the nonvolatile memory 102, and the memory controller 104 provides decrypted read data back to the processor 106.

The encryption/decryption logic 112 can be implemented as a portion of the hardware processing circuit of the memory controller 104, or alternatively, can be implemented as machine-readable instructions executable by the memory controller 104.

The electronic device 100 further includes a storage medium 114. The term "storage medium" can refer to one storage device or multiple storage devices. A storage device can refer to a memory, a disk-based storage device, or any other device that is capable of storing data. In some cases, the storage medium 114 can include the nonvolatile memory 102.

The storage medium 114 can store code that is executable on the processor 106. It is noted that a code that is executed on a processor can refer to the code executed on one processor or executed on multiple processors.

The storage medium 114 stores a power-on code 116 that performs a power-on process when the electronic device 100 is initially powered on from a power off state. A power off state can refer to a state where power is removed from the electronic device 100 or from certain components of the electronic device 100 (while power is maintained for other components of the electronic device 100). Examples of the power-on code 116 can include a boot code, such as a Basic Input/Output System (BIOS) code, which is an example of system firmware that is executable by an electronic device 100 during the initial stages of starting up the electronic device 100. The term "BIOS code" also refers to Unified Extensible Firmware Interface (UEFI) code.

In further examples, the power-on code 116 can include a security code that can be executed after execution of a boot code. The security code can include code stored in a secure area of the storage medium 114 (e.g., a tamper-resistant area of the storage medium 114), or can include code downloaded over a secure connection of a network from a remote server.

The storage medium 114 also stores an operating system (OS) 118, and an application program 120 (or multiple application programs). In examples where the storage medium 114 includes the nonvolatile memory 102, the OS 118 and/or the application program 120 can be part of the nonvolatile memory 102.

The power-on process performed by the power-on code 116 can include or can cause performance of a boot process in which electronic components of an electronic device 100 are initialized and tested, following which the boot process can launch the OS 118 for execution on the processor 106. Once the OS 118 is executed, the application program 120 can execute in an operating environment provided by the OS 118. The application program 120 can execute on the processor 106.

The power-on code 116 includes rekeying logic 122 to perform a rekeying procedure according to some implementations of the present disclosure. As noted above, a rekeying technique can refer to producing a new encryption key 124 in response to each new power-on process performed in the electronic device 100.

The encryption key 124 can be stored in the storage medium 114. The encryption key 124 is not stored in plaintext, but can be encrypted with another key (referred to as a "wrapping key"). The wrapping key (and possibly the encryption key 124 as well) can be stored in a tamper-resistant device such as a Trusted Platform Module (TPM) chip, or on a network in a key management server, or in another secure location. A wrapping key can be based on a password typed by a user, for example.

The memory controller 104 is able to access the encryption key 124, and the encryption key 124 can be used by the encryption/decryption logic 112 in the memory controller to encrypt data for encrypting write data that is written to the nonvolatile memory 102, and decrypting encrypted data read from the nonvolatile memory 102.

In some examples, the rekeying logic 122 can also maintain a watermark indication 126, which keeps track of a portion of the data 110 in the nonvolatile memory 102 that has been rekeyed. Rekeying data of the nonvolatile memory 102 refers to decrypting, using an old key, encrypted data read from the nonvolatile memory 102, and re-encrypting the decrypted data using a new key (produced as part of the rekeying procedure) and storing the re-encrypted data into the nonvolatile memory 102.

In some examples, the watermark indication 126 can keep track of the latest address of the data 110 that has been rekeyed. Thus, in case the rekeying procedure is interrupted for any reason, such as due to power loss of the electronic device 100 or a fault or error of the electronic device 100, the rekeying logic 122 can access the watermark indication 126 to determine which portion of the data 110 stored in the nonvolatile memory 102 has already been rekeyed, and can proceed to rekey the remaining (un-rekeyed) portion of the data 110 in nonvolatile memory 102.

The rekeying of the data 110 in nonvolatile memory 102 is performed during the power-on process, and the power-on code 116 prevents the OS 118 from being launched until all data 110 of the nonvolatile memory 102 has been rekeyed. By insisting on completing the rekeying procedure before allowing the OS 118 to boot (after which new data can be written to the nonvolatile memory 102 by the OS 118 or an application program 120) eliminates the existence of any old data in the nonvolatile memory 102 which can be used by an attacker in a replay attack.

Figure 2:
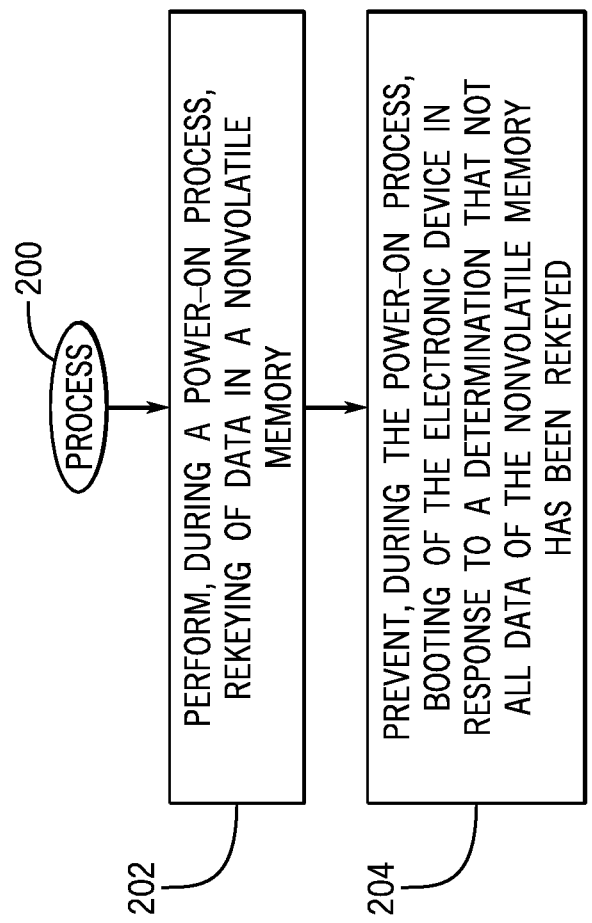
FIG. 2 is a block diagram of a process according to some examples.

FIG. 2 is a flow diagram of a process 200 that can be performed in the electronic device 100, such as by the power-on code 116 (including the rekeying logic 122) of FIG. 1. The process 200 includes performing (at 202), during a power-on process, rekeying of data in a nonvolatile memory (e.g., 102 in FIG. 1), where the rekeying includes reading the data form the nonvolatile memory using a first key (an old key) and writing back the data to the nonvolatile memory using a second key (a new key) different from the first key.

The second key can be generated during the power-on process, such as by the rekeying logic 122, using any of the following techniques: generating the second key using a random key generation process (e.g., producing a random number using a random number generator and using the random number to generate the second key), selecting the second key from multiple pre-stored keys (which can be stored in a storage medium of the electronic device 100), retrieving the second key from a key server remote from the electronic device 100 over a secure connection, and so forth.

The process 200 prevents (at 204), during the power-on process, booting of the electronic device in response to a determination that not all data of the nonvolatile memory has been rekeyed.

Figure 3:
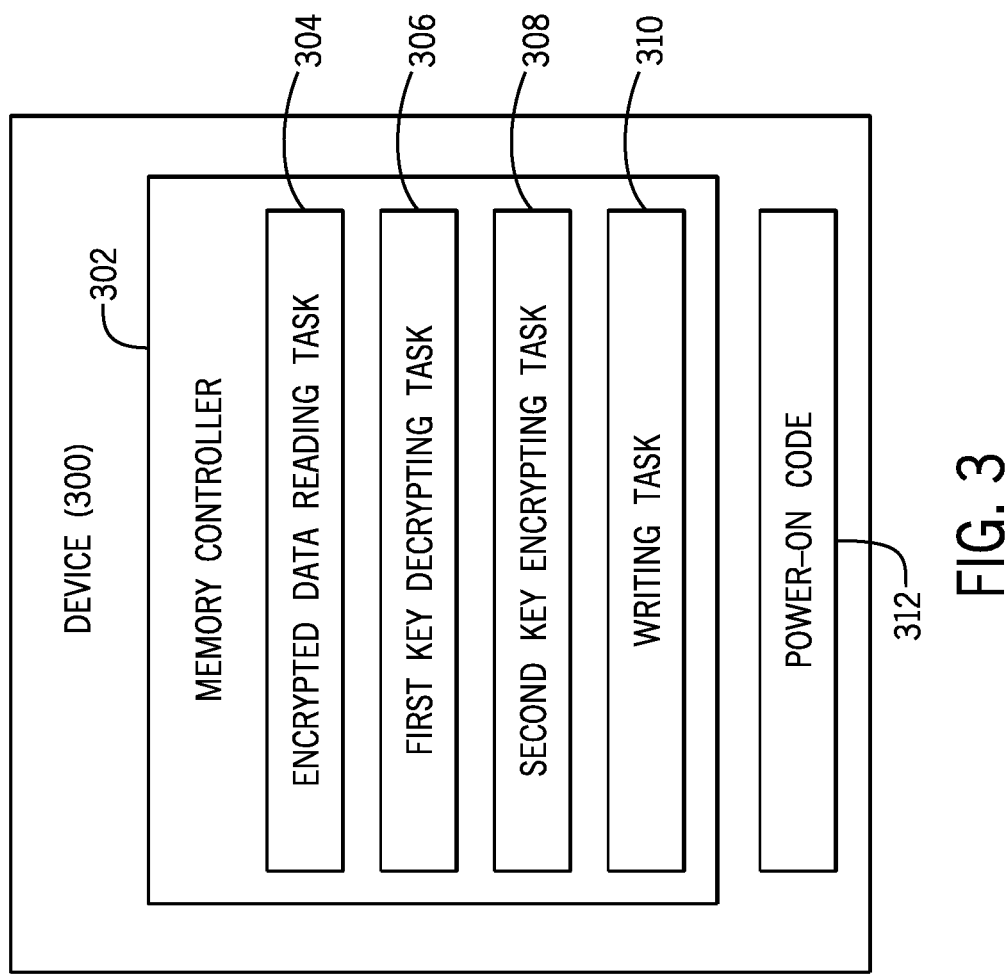
FIG. 3 is a block diagram of a device according to further examples.

FIG. 3 is a block diagram of a device 300 according to further examples. The device 300 can include the electronic device 100, or a different electronic device. The device 300 includes a memory controller 302 to, during a power-on process of the device 300, perform various tasks. The tasks that are performed by the memory controller 302 includes an encrypted data reading task 304 to read encrypted data from a nonvolatile memory (e.g., 102 in FIG. 1), and a first key decrypting task 306 to decrypt, using a first key, the encrypted data to produce decrypted data. The tasks further include a second key encrypting task 308 to encrypt, using a second key different from the first key, the decrypted data to produce new encrypted data, and a writing task 310 to write the new encrypted data to the nonvolatile memory.

The device 300 further includes a power-on code 312 to prevent booting of the device 300 until all data in the nonvolatile memory has been encrypted using the second key. The power-on code 312 checks that all data in the nonvolatile memory has been encrypted using the second key, and in response to the checking, the power-on code 312 allows the booting of the device 300. The booting of the device 300 includes loading an OS of the device 300. Preventing the booting of the device 300 includes preventing the loading of the OS.

Figure 4:
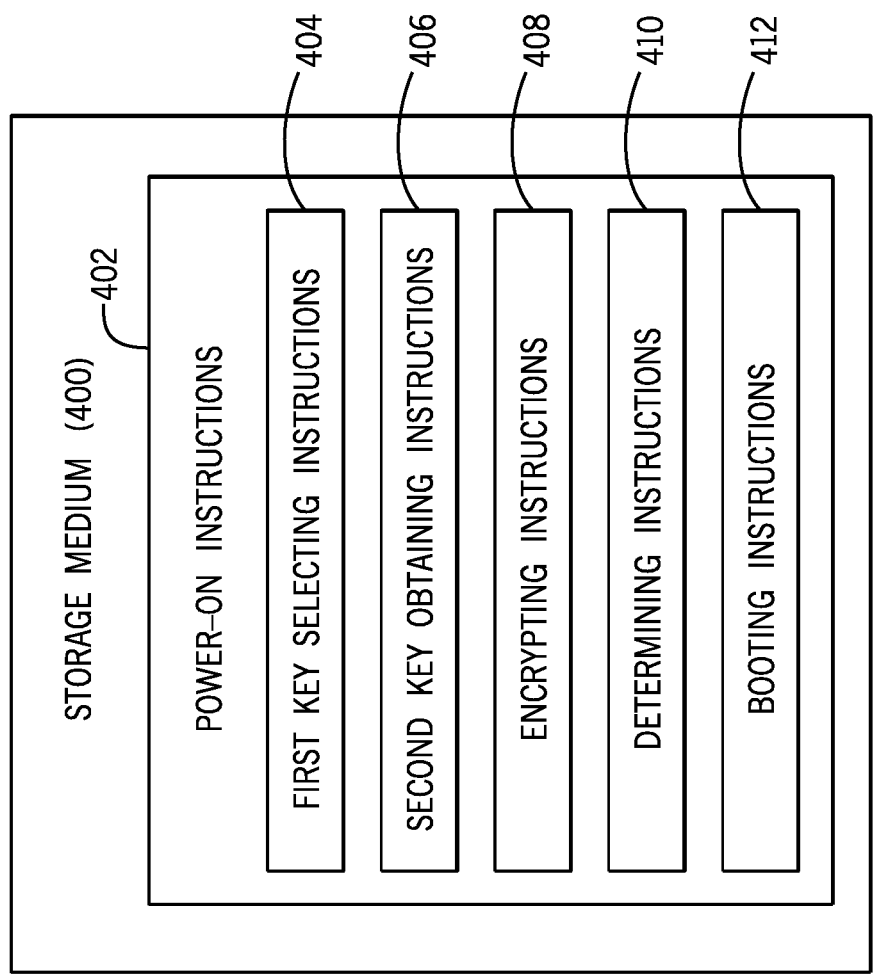
FIG. 4 is a block diagram of a storage medium storing machine-readable instructions according to additional examples.

FIG. 4 is a block diagram of a non-transitory machine-readable or computer-readable storage medium 400 storing machine-readable instructions that upon execution cause a device to perform various tasks. The machine-readable instructions include power-on instructions 402 that perform a power-on process. The power-on instructions 402 include first key selecting instructions 404 that select a first key and cause a memory controller to decrypt data in a nonvolatile memory using the first key to produce decrypted data. The power-on instructions 402 further include second key obtaining instructions 406 to obtain a second key different from the first key. The power-on instructions 402 further include encrypting instructions 408 to cause the memory controller to encrypt the decrypted data using the second key to produce new encrypted data, and to write the new encrypted data to the nonvolatile memory. The power-on instructions 402 further include determining instructions 410 to determine whether all data in the nonvolatile memory has been encrypted using the second key. The power-on instructions 402 further include booting instructions 412 to, in response to determining that all data in the nonvolatile memory has been encrypted using the second key, boot the device.

The storage medium 402 of FIG. 4 or the storage medium 114 of FIG. 1 can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A device comprising:
a memory controller; and
a non-volatile memory communicatively coupled to the memory controller,
wherein the memory controller is to execute computer instructions to rekey data in the nonvolatile memory, the computer instructions including instructions to:
determine a power-on process of the device that indicates that the device has been switched on;
in response to determining the power-on process:
read a first piece of encrypted data from the nonvolatile memory, wherein the first piece of encrypted data is associated with a first encryption key,
decrypt, using the first encryption key, the first piece of encrypted data to obtain a piece of decrypted data,
encrypt, using a second encryption key distinct from the first encryption key and produced as part of the rekeying of the data in the nonvolatile memory, the piece of decrypted data to produce a second piece of encrypted data, and
write the second piece of encrypted data to the nonvolatile memory; and
power-on logic block to prevent, during the power-on process of the device, booting of the device until a respective piece of the data in the nonvolatile memory has been encrypted using the second encryption key.

2. The device of claim 1, wherein the power-on logic block is to provide the second encryption key to the memory controller.

3. The device of claim 1, wherein the second encryption key is obtained by one of:
generating the second encryption key using a random key generation process,
selecting the second encryption key from a plurality of pre-stored keys, and
retrieving the encryption second key from a key server remote from the device.

4. The device of claim 1, wherein the power-on logic block is further to:
maintain an indication that indicates a portion of the data in the nonvolatile memory that has been encrypted using the second encryption key, and
responsive to the indication indicating a completion, allow the booting of the device.

5. The device of claim 4, wherein the booting of the device comprises booting an operating system of the device.

6. The device of claim 4, wherein:
the first piece of encrypted data is in the portion of the nonvolatile memory that has been encrypted using the second encryption key.

7. The device of claim 4, wherein the power-on logic block is further to:
determine an interruption to the power-on process prior to determining the completion, and
in response to determining that the interruption has ended, cause the memory controller to resume, based on the indication, encryption of a remainder of the data in the nonvolatile memory using the second encryption key.

8. The device of claim 4, wherein the indication has been generated in a previous power-on process.

9. A non-transitory machine-readable storage medium storing instructions that upon execution cause a device to:
determine a power-on process of the device that indicates that the device has been switched on;
in response to determining the power-on process:
obtain a first piece of data from a nonvolatile memory of the device;
decrypt, using the first encryption key the first piece of encrypted data to obtain decrypted data;
encrypt, using a second encryption key distinct from the first encryption key and produced as part of the rekeying of the data in the nonvolatile memory, the decrypted piece of data using the second encryption key to produce a second piece of encrypted data; and
write the piece of second encrypted data to the nonvolatile memory; and
prevent, during the power-on process of the device, booting of the device until a respective piece of the data in the nonvolatile memory has been encrypted using the second encryption key.

10. The non-transitory machine-readable storage medium of claim 9, wherein the instructions upon execution cause the device further to:
maintain an indicator that indicates a portion of the data in the nonvolatile memory that has been encrypted using the second encryption key; and
responsive to the indication indicating a completion, allow the booting of the device.

11. The non-transitory machine-readable storage medium of claim 10, wherein the booting comprises booting an operating system of the device.

12. The non-transitory machine-readable storage medium of claim 10, wherein the instructions upon execution cause the device further to:
determine an interruption to the power-on process prior to determining the completion; and
in response to determining that the interruption has ended, resume, based on the indication, encryption of a remainder of the data in the nonvolatile memory using the second encryption key.

13. The non-transitory machine-readable medium of claim 10, wherein the first piece of encrypted data is in the portion of the nonvolatile memory that has been encrypted using the second encryption key.

14. The non-transitory machine-readable medium of claim 9, wherein the second encryption key is obtained by one of:
generating the second encryption key using a random key generation process,
selecting the second encryption key from a plurality of pre-stored keys, and
retrieving the encryption second key from a key server remote from the device.

15. A method for rekeying data in a nonvolatile memory of a device, comprising:
   determining a power-on process of the device that indicates that the device has been switched on;
   in response to determining the power-on process:
      reading a first piece of encrypted data from the nonvolatile memory, wherein the first piece of encrypted data is associated with a first encryption key;
      decrypting the first piece of encrypted data using the first encryption key to obtain a piece of decrypted data;
      encrypting the piece of decrypted data using a second encryption key, which is distinct from the first encryption key and produced as part of the rekeying of the data in the nonvolatile memory, to produce a second piece of encrypted data; and
      writing the second piece of encrypted data to the nonvolatile memory, and
   preventing, during the power-on process of the device, booting of the device until a respective piece of the data in the nonvolatile memory has been encrypted using the second encryption key.

16. The method of claim 15, wherein the booting of the device comprises booting an operating system of the device.

17. The method of claim 15, further comprising:
   maintaining an indication that indicates a portion of the data in the nonvolatile memory that has been encrypted using the second encryption key; and
   responsive to the indication indicating a completion, allowing the booting of the device.

18. The method of claim 17, further comprising:
   determine an interruption to the power-on process prior to determining the completion; and
   in response to determining that the interruption has ended, resuming, based on the indication, encryption of a remainder of the data in the nonvolatile memory using the second encryption key.

19. The method of claim 17, wherein the first piece of encrypted data is in the portion of the nonvolatile memory that has been encrypted using the second encryption key.

20. The method of claim 15, wherein the second encryption key is obtained by one of:
   generating the second encryption key using a random key generation process,
   selecting the second encryption key from a plurality of pre-stored keys, and
   retrieving the encryption second key from a key server remote from the device.

* * * * *